United States Patent Office 2,782,601
Patented Feb. 26, 1957

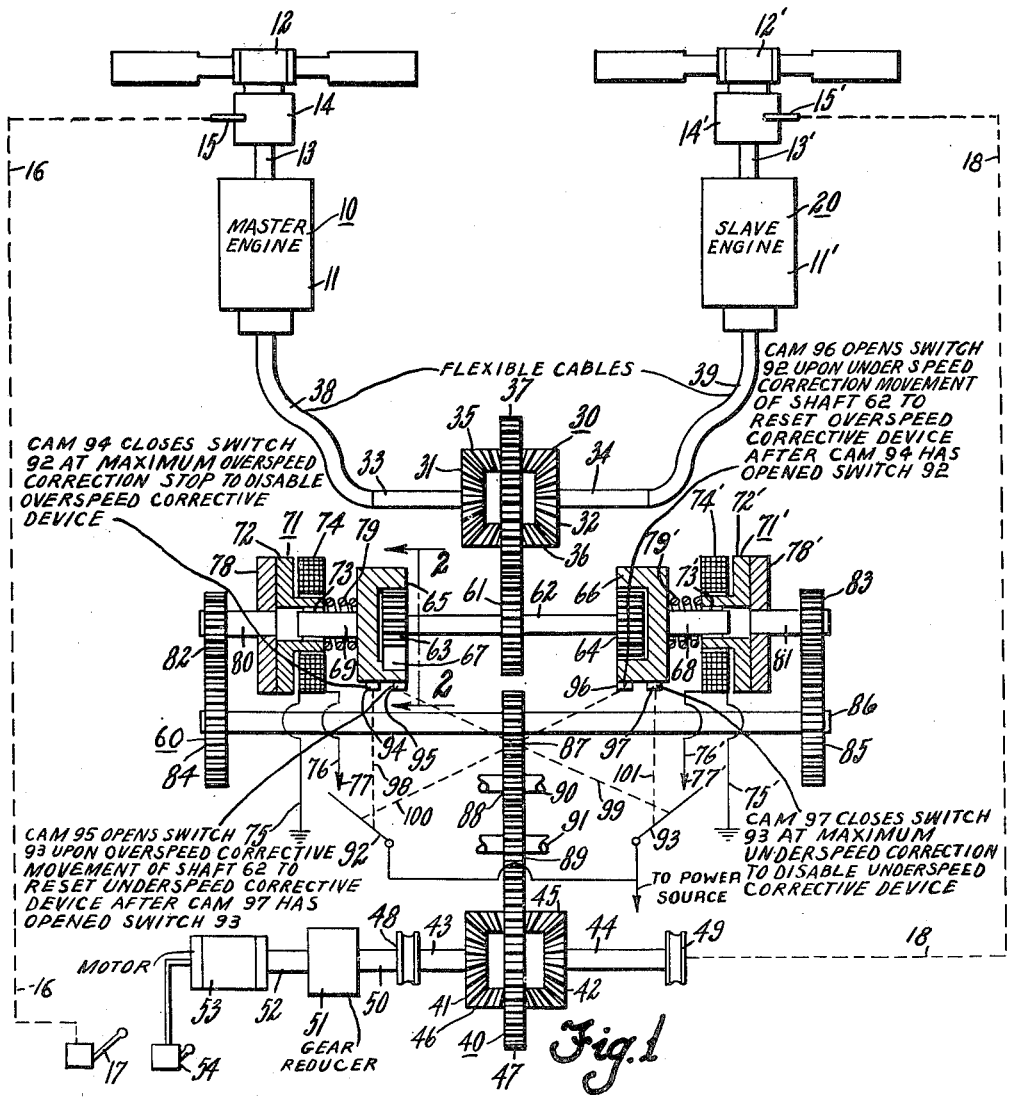
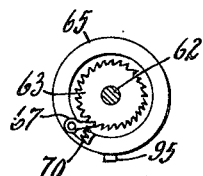

2,782,601
ELECTRO-MECHANICAL SYNCHRONIZING APPARATUS

Robert C. Hamilton, Dayton, Ohio, assignor to General Motors Corporation, Detroit, Mich., a corporation of Delaware Application September 25, 1952, Serial No. 311,353

10 Claims. (Cl. 60—97)

The present invention relates to mechanism for synchronizing the speeds of a plurality of engines, and has particular reference to electro-mechanical mechanism for maintaining aircraft engines in synchronous speed operation.

When two or more engine-propeller combinations are rotating at slightly different speeds, a vibration beat develops, the frequency of which is dependent upon the speed differences existent between the engines. To eliminate the detrimental effects of vibration beats in aircraft, automatic synchronizer mechanisms are employed to maintain the engines in speed synchronization with each other. In addition the synchronizer mechanisms preferably include means for adjusting speeds of the engines independently. Accordingly, one of my objects is to provide a synchronizing mechanism having means permitting either manual or automatic speed control of the engines.

The aforementioned and other objects are generally accomplished in the present invention by providing means for adjusting or resetting speed sensitive governors associated with the pitch controlling mechanism of the several engine-propeller combinations. Specifically, the present invention employs mechanical error sensing and error correcting differentials. Opposite sides of the error sensing differential are driven at speeds commensurate with that of the engines in a twin-engine aircraft. However, the apparatus may be adapted for utilization on a multi-engine aircraft having more than two engines by driving one input gear of each error sensing differential unit from a master engine or from a master reference speed source, while the other input gear of each error sensing differential is driven by one of the controlled engines. The error sensing differential output is transmitted by the ring gear or spider thereof through an error correction limiting device to the ring gear of the error correcting mechanical differential.

The error correction limiting device is employed as a safety feature enabling the pilot to be cognizant at all times of the approximate position of a regulator control lever, which adjusts the governor speed setting. In the instant disclosure only limited synchronization error correction is available, the limits of which are defined by stops, in order that malfunctions of the synchronizer will not materially effect propeller control. The error correction limiting device includes a pair of unidirectional drive mechanisms operatively connected with the ring gear of the error sensing differential, in combination with a pair of solenoid operated clutches, the energization of which are controlled by cam actuated microswitches. Due to the fact the apparatus is designed to utilize flexible cables between the input gears of the error sensing differential and the engines, positive stops cannot be utilized, as precluding movement of the error sensing differential output would result in destruction of the flexible cables.

The speed of each engine may be adjusted manually through resetting of the governor associated therewith. This result is achieved by providing means for actuating the regulator lever of the controlled engine through the error correcting differential embodying a ring gear operatively associated with the output of the error sensing differential through the correction limiting device. Opposite sides of the error correcting differential are connected respectively to the regulator lever and a manual control mechanism. In this manner the regulator lever and, perforce, the speed setting of the controlled engine may be adjusted either automatically by the error sensing differential through movement of the ring gear, or manually through one side of the differential by a manual control mechanism. As disclosed, the master engine governor may be reset or adjusted manually through a manual control having a mechanical connection with the regulator lever thereof.

Further objects and advantages of the present invention will be apparent from the following description, reference being had to the accompanying drawing wherein a preferred embodiment of the present invention is clearly shown.

In the drawing:

Fig. 1 is a schematic view of synchronizing mechanism constructed according to the present invention.

Fig. 2 is a sectional view taken along line 2—2 of Fig. 1.

Although the present invention is exemplified in conjunction with a twin-engine aircraft wherein one of the propeller-engine combinations is employed as a master speed source, it is to be understood that departure therefrom is within the scope of this invention. Accordingly, a standard reference speed source may be employed and the apparatus disclosed may be adapted to a multi-engine aircraft having more than two engines. Referring particularly to the drawing, a master engine-propeller combination is indicated by the numeral 10 and a controlled engine-propeller combination is indicated by the numeral 20. As each engine-propeller combination is a duplicate of the other, it is deemed sufficient to describe only one in detail. The engine-propeller combinations are generally of the type disclosed in the copending application, Serial No. 94,944, filed May 24, 1949, now Patent No. 2,673,309, in the name of James W. Light et al., in which an engine 11 drives a propeller unit 12 through a shaft 13. Corresponding parts of the controlled engine-propeller combination are indicated by like numbers with primes affixed. The propeller unit 12 is of the variable pitch type, the pitch of which is automatically controlled by the distribution of fluid under pressure from a regulator 14, which is connected to and rotates with the propeller. Protruding from the regulator casing is a regulator control lever 15. The regulator lever 15 is operatively connected with a governor, not shown, disposed within a regulator, and movements of the regulator lever will adjust the speed setting of the governor. The governor disposed within the regulator may, for example, be of the centrifugally actuated type.

The regulator lever 15 of the master engine-propeller combination 10 is connected by mechanical linkage 16 to a pilot speed control lever 17. The regulator lever 15' of the controlled engine-propeller combination 20 is connected by means of a mechanical linkage 18 to the output side of an error correcting mechanical differential unit 40. The error correcting differential unit 40 comprises a pair of spaced bevel gears 41 and 42 attached to shafts 43 and 44, respectively. The two bevel gears 41 and 42 mesh with two common idler bevel gears 45 and 46, whose shafts, not shown, are mounted in a differential ring gear 47. The differential unit 40 is of conventional design and construction and, per se, forms no part of the present invention. The differential ring gear 47 is operatively connected to an error correction limiting device designated generally by the numeral 60, which will later be described. Shafts 43 and 44 of the differential unit 40 have attached thereto pulleys 48 and 49, respectively. As will be apparent to those familiar with the operation of mechanical differential units, if the ring gear 47 is held stationary, any movement experienced by pulley 48 and bevel gear 41 will be followed instantly and accurately within the backlash limits of the differential by the bevel gear 42 and the pulley 49. When the pulley 48 and the bevel gear 41 are held stationary, movement of the bevel gear 42 and the pulley 49 may be accomplished through rotation of the differential ring gear 47. The pulley 48 is connected by means of cable 50 to the output of a gear reducing unit 51, the input of which is connected by a shaft 52 to a reversible electric motor 53. Energization of the reversible electric motor 53 is under the control of a switch 54, which may be manually actuated by the pilot. In this manner the pilot can manually adjust the position of the regulator lever 15' on the controlled engine-propeller combination 20 to select the speed of operation thereof through the error correcting differential 40, when the differential ring gear 47 thereof is held stationary.

The error correction limiting device 60 is also operatively connected with an error sensing mechanical differential unit 30. The error sensing differential unit 30 is similar in construction to that of the error correcting differential unit 40 and comprises a pair of input bevel gears 31 and 32 mounted on shafts 33 and 34, respectively. The gears 31 and 32 mesh with two common idler bevel gears 35 and 36, whose shafts, not shown, are mounted in a differential ring gear 37. The shafts 33 and 34 are operatively connected with the propeller units 10 and 20, respectively, by means to be later described, whereby the rotative speeds of gears 31 and 32 will be commensurate with that of the shafts 13 and 13'.

It will be understood that in accordance with the principles of operation of differential gearing, so long as gears 31 and 32 turn at equal angular velocities in opposite directions, the gears 35 and 36 will turn idly about their shafts, not shown, and the differential ring gear 37 will remain stationary. Any suitable means are interposed in the connection between the shafts 33 and 34 and the propeller units 10 and 20 to obtain rotation of the gears 33 and 34 in opposite directions. If there is a difference between the angular velocities of the shafts 33 and 34 and, accordingly, the gears 31 and 32, rotary movement will be imparted to differential ring gear 37 proportionate to the aforementioned difference in velocity. Accordingly, if the shaft 33 and the gear 31 are rotating more rapidly than the shaft 34 and the gear 32, the increment in angular velocity imparted to idler gears 35 and 36 by gear 31 will be compensated for by turning of the ring gear 37 at a rate equal to one-half of the angular velocity difference between gears 31 and 32 in one direction. If on the other hand, the rotary velocity of gear 32 exceeds that of gear 31, the ring gear 37 will likewise turn proportionally to the difference in angular velocity but in the opposite direction.

In the instant disclosure shafts 33 and 34 are connected by flexible cables 38 and 39 to shafts 13 and 13' of the engine-propeller combinations 10 and 20, respectively. The differential ring gear 37 meshes with a spur gear 61 forming part of the error correction limiting device 60. As hereinbefore mentioned, the error correction limiting device is employed as a safety feature whereby the pilot will always be cognizant of the approximate position of the regulator control lever 15' associated with the controlled propeller unit 12'. Only a limited synchronization error correction factor can be transmitted to the regulator lever 15 in order to preclude the possibility of erratic operation of the controlled engine-propeller combination 20 in the event of a malfunction occurring in the synchronizer mechanism. The spur gear 61 is attached to a shaft 62 suitably supported by bearings, not shown, having ratchet wheels 63 and 64 attached to opposite extremities thereof. Coaxially disposed about the outer periphery of ratchet wheel 63 is a casing 65 having an internal pawl 67, shown in Fig. 2, the housing 65 being attached to a shaft 69 suitably supported by bearing means, not shown. In a similar manner, a housing 66 having an internal pawl, not shown, is coaxially mounted about the outer periphery of ratchet wheel 64, the housing 66 being attached to a shaft 68 which is supported by suitable bearing means, not shown. The pawl and ratchet wheel combinations form a pair of unidirectional drive mechanisms, the unit 63, 65 of which is designed for clockwise rotation, while the unit 64, 66 is designed for counterclockwise rotation. As the unidirectional drive pawl and ratchet units are identical, except for the fact they are adapted to drive in opposite directions, a description of one is deemed adequate.

With particular reference to Fig. 2, the pawl 67 is pivoted within the casing 65 and is urged against a ratchet wheel 63 by means of a spring 70. Accordingly, rotation of ratchet wheel 63 in a clockwise direction, as viewed in the drawing, will transmit movement to the housing 65 and the shaft 69 through the pawl 67, while rotation of the ratchet wheel 63 in a counterclockwise direction will transmit no movement to the housing 65. In the instant disclosure clockwise movement of the shaft 62 occurs when the speed of the controlled engine-propeller combination 20 exceeds that of the master 10 and counterclockwise movement of shaft 62 occurs when the speed of controlled unit 20 is less than that of the master unit 10.

Each of the shafts 68 and 69 has associated therewith a solenoid operated clutch. The solenoid operated clutches 71 and 71' are of identical construction and, accordingly, a description of one is deemed adequate with like parts of the other denoted by like numerals with primes affixed. Each clutch 71 includes a driving member 72 having straight spline engagement at 73 with one of the shafts 68 or 69. The driving clutch member 72 has associated therewith a solenoid winding 74 connected by leads 75 and 76 to ground and a switch contact 77, respectively. The clutch plate 72 is normally maintained in driving engagement with a driven clutch plate 78 by means of a compression spring 79 interposed between the driving clutch plate and the unidirectional ratchet and drive pawl housings. It will be understood that when the solenoid windings 74 and 74' are deenergized, the springs 79 and 79' will maintain the clutch plates 72 and 78 and 72' and 78' in driving engagement, and upon energization of the windings, the clutch plates will be disengaged. The driven clutch plates 78 and 78' are attached to the ends of shafts 80 and 81, respectively, the shafts being supported by suitable bearing means, not shown. The shafts 80 and 81 drive spur gears 82 and 83, respectively, which mesh with spur gears 84 and 85, respectively, attached to opposite extremities of a shaft 86 supported by suitable bearing means, not shown. A spur gear 87 is anchored to the shaft 86 intermediate its ends, the gear 87 having operative engagement with the differential ring gear 47 of the error correcting differential 40 through a pair of gears 88 and 89 supported on shafts 90 and 91, respectively.

A pair of single throw, double pole reset type microswitches 92 and 93 of conventional construction, connected by conductive leads to an electric power source, not shown, are employed to control the energization of solenoid windings 74 and 74' to establish the limits of automatic synchronization correction. The housing 65 of the clockwise unidirectional drive mechanism is provided with a pair of cam surfaces 94 and 95, and the housing 66 of the counterclockwise unidirectional drive mechanism is provided with a pair of cam surfaces 96 and 97. The cam 94 has associated therewith a cam follower, not shown, connected by a mechanical linkage 98 to the movable blade of the microswitch 92, while the cam 95 has associated therewith a follower, not shown, which is operatively connected by a mechanical linkage 99 to the blade of the microswitch 93. Likewise, the cam 96 has associated therewith a cam follower, not shown, operatively connected by a linkage 100 to the switch blade of the microswitch 92, and cam 97 has associated therewith a follower, not shown, mechanically connected by linkage 101 to the switch blade of microswitch 93. The cam surface 94 on the housing 65 is so arranged and constructed to close the microswitch 92, whereby clutch plates 72 and 78 will be disengaged when a maximum overspeed correction stop is reached.

The basic operating principle of the error correction limiting device 60 is as follows: A slight overspeed correction movement of shaft 62 from the zero correction point will reset the underspeed correction device by opening microswitch 93 thus engaging clutch plates 72' and 78'. A slight underspeed correction movement of shaft 62 from the zero correction point will reset the overspeed correction device by opening microswitch 92 thus engaging clutch plates 72 and 78. Further overspeed correction movement of shaft 62 from the zero correction point may occur until the overspeed correction stop is encountered when cam surface 94 on housing 65 closes microswitch 92 through linkage 98 to energize solenoid 74 and disengage clutch plates 72 and 78. The flexible shafts 38 and 39 can continue to rotate freely but no further overspeed correction of the propeller governor 14' can be made by the synchronizer. Only underspeed correction can now be made. Further underspeed correction movement of shaft 62 from the zero correction point may occur until the underspeed correction stop is encountered when cam surface 97 on housing 66 closes microswitch 93 through linkage 101 to energize solenoid 74' and disengage clutch plates 72' and 78'. The flexible shafts 38 and 39 can continue to rotate freely but no further underspeed correction of the propeller governor 14' can be made by the synchronizer. Only overspeed correction can now be made. The overspeed and underspeed correction stops are set so that the propeller governors 14 and 14' may not be automatically reset more than ±75 R. P. M. Either propeller governor 14 or 14' may be reset manually in either direction at any time by lever 17 and linkage 16 or switch 54 and the motor 53.

In operation the error sensing differential will automatically apply a correction through the error correction limiting device to the error correcting differential and, thence, to the controlled propeller unit when the speed difference between the units 10 and 20 is within the predetermined established limits. However, if the time integral of the synchronization error, i. e. the algebraic summation of the speed errors over a given period of time, between the units 10 and 20 exceeds that of the predetermined automatic correction limits, the pilot may manually adjust the speed of either unit 10 or 20 to bring the speeds back into the range of automatic synchronization.

The apparatus disclosed is of relatively simple design and is extremely reliable. Flexibility is provided in that both of the engine-propeller units may be controlled manually to bring the speeds thereof within the range of automatic synchronization. Moreover, the disclosed embodiment may be modified for use upon a multi-engine aircraft having more than two engines by driving one of the input gears of the error sensing differential from the common reference speed source while driving the other input gear of each differential at a speed commensurate with that of the controlled propeller engine combinations. In this type of arrangement the speed of each controlled engine may be varied manually through the error correcting mechanical differential in a manner similar to that described in connection with a twin-engine craft.

While the embodiment of the present invention as herein disclosed, constitutes a preferred form, it is to be understood that other forms might be adopted.

What is claimed is as follows:

1. In a mechanism for synchronizing the speed of a controlled engine with the speed of a master engine, a governor for controlling the speed of each engine, a differential mechanism disposed between said engines and having its opposite sides driven by said engines, a displaceable member operatively connected with the governor of said controlled engine and associated with said differential mechanism to be displaced thereby upon a variation in the speed of the controlled engine with respect to the speed of the master engine, the operative connection between said displaceable member and the governor of said controlled engine including a movable element, and an electrical error correction limiting device disposed between said displaceable member and the movable element, said error correction limiting device defining a range of movement of said movable element by said displaceable member whereby only a predetermined synchronization error correction can be applied to the governor of said controlled engine.

2. In a mechanism for synchronizing the speed of a controlled engine with the speed of a master engine, a governor for controlling the speed of each engine, a manual control for each governor, a differential mechanism disposed between said engines and having its opposite sides driven by said engines, a displaceable member operatively connected with the governor of said controlled engine and associated with said differential mechanism to be displaced thereby upon a variation in the speed of the controlled engine with respect to the speed of the master engine, the operative connection between said displaceable member and the governor of said controlled engine including a movable element, and an electrical error correction limiting device disposed between said displaceable member and the movable element, said error correction limiting device defining a range of movement of said movable element by said displaceable member whereby only a predetermined synchronization error correction can be applied to the governor of said controlled engine.

3. In a mechanism for synchronizing the speed of a controlled engine with the speed of a master engine, a governor for controlling the speed of each engine, a differential mechanism disposed between said engines and having its opposite sides driven by said engines, a displaceable member operatively connected with the governor of said controlled engine and associated with said differential mechanism to be displaced thereby upon a variation in the speed of the controlled engine with respect to the speed of the master engine, and an error correction limiting device interposed between said displaceable member and the governor of said controlled engine including a pair of unidirectional drive assemblies and associated stops establishing a maximum overspeed correction limit and a maximum underspeed correction limit, said error correction limiting device defining an effective range of movement of said displaceable member whereby only a predetermined synchronization error correction can be applied to the governor of said controlled engine.

4. In a mechanism for synchronizing the speed of a controlled engine with the speed of a master engine, a governor for controlling the speed of each engine, a manual control for each governor, a differential mechanism disposed between said engines and having its opposite sides driven by said engines, a displaceable member operatively connected with the governor of said controlled engine and associated with said differential mechanism to be displaced thereby upon a variation in the speed of the controlled engine with respect to the speed of the master engine, and an error correction limiting device interposed between said displaceable member and the governor of said controlled engine including a pair of unidirectional drive assemblies and associated stops establishing a maximum overspeed correction limit and a maximum underspeed correction limit, said error correction limiting device defining an effective range of movement of said displaceable member whereby only a predetermined synchronization error correction can be applied to the governor of said controlled engine.

5. In a mechanism for synchronizing the speed of a controlled engine with the speed of a master engine, governor means associated with each engine, a first differential mechanism disposed between said engines and having its opposite sides driven by said engines, a first displaceable member associated with said first differential mechanism to be displaced thereby upon variation of the speed of the controlled engine with respect to the speed of the master engine, a second differential mechanism disposed between said first displaceable member and said controlled engine, said second differential mechanism having a second displaceable member operatively connected to said first displaceable member, the opposite sides of said second differential mechanism being operatively connected to a manual control and the governor means of said controlled engine, respectively, whereby the governor means of said controlled engine may be adjusted manually through opposite sides of said second differential or automatically through said second displaceable member and one side of said second differential mechanism.

6. In a mechanism for synchronizing the speed of a controlled engine with the speed of a master engine, governor means associated with each engine, a first differential mechanism disposed between said engines and having its opposite sides driven by said engines, a first displaceable member associated with said first differential mechanism to be displaced thereby upon variation of the speed of the controlled engine with respect to the speed of the master engine, a second differential mechanism disposed between said first displaceable member and said controlled engine, said second differential mechanism having a second displaceable member operatively connected to said first displaceable member, the opposite sides of said second differential mechanism being operatively connected to a manual control and the governor means of said controlled engine, respectively, whereby the governor means of said controlled engine may be adjusted manually through opposite sides of said second differential or automatically through said second displaceable member and one side of said second differential mechanism, and an electrical error correction limiting device interposed in the operative connection between said first and said second displaceable members, said error correction limiting device defining an effective range of movement of said first displaceable member whereby only a predetermined synchronization error correction can be automatically applied to the governor means of said controlled engine.

7. In a mechanism for synchronizing the speed of a controlled engine with the speed of a master engine, governor means associated with each engine, a first differential mechanism disposed between said engines and having its opposite sides driven by said engines, a first displaceable member associated with said first differential mechanism to be displaced thereby upon variation of the speed of the controlled engine with respect to the speed of the master engine, a second differential mechanism disposed between said first displaceable member and said controlled engine, said second differential mechanism having a second displaceable member operatively connected to said first displaceable member, the opposite sides of said second differential mechanism being operatively connected to a manual control and the governor means of said controlled engine, respectively, whereby the governor means of said controlled engine may be adjusted manually through opposite sides of said second differential or automatically through said second displaceable member and one side of said second differential mechanism, and an error correction limiting device interposed in the operative connection between said first and said second displaceable members including a pair of unidirectional drive assemblies and associated stops establishing a maximum overspeed correction limit and a maximum underspeed correction limit, said error correction limiting device defining an effective range of movement of said first displaceable member whereby only a predetermined synchronization error correction can be automatically applied to the governor means of said controlled engines.

8. Mechanical mechanism for synchronizing the speed of a controlled engine with the speed of a master engine including, means for comparing the speeds of said engines, an element displaced upon variation in the speed of the controlled engine with respect to the speed of the master engine, governor means associated with each engine, a manual control for each governor, a differential mechanism interposed between said displaceable element and the governor means for said controlled engine and having opposite sides connected to the manual control for said controlled engine and the governor means for said controlled engine respectively, and a displaceable member operatively connected with said displaceable element and associated with said differential mechanism to be displaced by said displaceable element upon a variation in the speed of the controlled engine with respect to the master engine.

9. In a mechanism for synchronizing the speed of a controlled engine with that of a master reference speed source, governor means associated with the engine, a first differential mechanism disposed between said engine and said master reference source, a first displaceable member operatively associated with said first differential mechanism to be displaced thereby upon variation in the speed of said controlled engine with respect to the speed of the master reference source, a second differential mechanism disposed between said first displaceable member and said controlled engine, a second displaceable member operatively connected with said second differential mechanism and operatively connected to said first displaceable member, opposite sides of said second differential mechanism being connected to a manual control for said engine and the governor means of said engine, whereby the governor of said controlled engine may be adjusted manually through opposite sides of said second differential or automatically through said second displaceable member and one side of said second differential mechanism.

10. In a mechanism for synchronizing the speed of a controlled engine with that of a master reference speed source, means for comparing the speed of said engine with that of the master reference speed source, a displaceable element for said engine adapted to be displaced upon variation in the speed of said engine with respect to the speed of the master reference source, governor means for said engine, a manual control for said governor means, a differential mechanism disposed between said displaceable element and the governor means for said engine and having opposite sides connected to the manual control of said engine and the governor means therefor, and a displaceable member associated with said differential mechanism and operatively connected to said displaceable element to be displaced by said displaceable element upon a variation in the speed of said controlled engine with respect to the speed of the master reference source.

References Cited in the file of this patent

UNITED STATES PATENTS

| | | |
|---|---|---|
| 1,368,755 | Roddey | Feb. 15, 1921 |
| 1,465,091 | Prince | Aug. 14, 1923 |
| 1,886,975 | Profitlich | Nov. 8, 1932 |
| 2,003,558 | Schmidt | June 4, 1935 |
| 2,054,908 | Moore | Sept. 22, 1936 |
| 2,105,089 | Martin | Jan. 11, 1938 |
| 2,144,429 | Martin | Jan. 17, 1939 |
| 2,252,545 | Benz | Aug. 12, 1941 |
| 2,268,230 | Warner | Dec. 30, 1941 |
| 2,307,334 | Peek | Jan. 5, 1943 |
| 2,399,685 | McCoy | May 7, 1946 |
| 2,400,579 | Wahlberg | May 21, 1946 |